(12) United States Patent
Mouly et al.

(10) Patent No.: US 11,859,560 B2
(45) Date of Patent: Jan. 2, 2024

(54) POWER TRANSMISSION MODULE FOR AN AIRCRAFT TURBOMACHINE

(71) Applicant: SAFRAN TRANSMISSION SYSTEMS, Colombes (FR)

(72) Inventors: Guillaume Pierre Mouly, Moissy-Cramayel (FR); Adrien Louis Simon, Moissy-Cramayel (FR); Guillaume Julien Beck, Moissy-Cramayel (FR); Simon Loic Clement Lefebvre, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/933,606

(22) Filed: Sep. 20, 2022

(65) Prior Publication Data

US 2023/0091328 A1    Mar. 23, 2023

(30) Foreign Application Priority Data

Sep. 21, 2021  (FR) ...................................... 2109922

(51) Int. Cl.
*F02C 7/36*        (2006.01)
(52) U.S. Cl.
CPC .......... *F02C 7/36* (2013.01); *F05D 2220/323* (2013.01); *F05D 2240/60* (2013.01); *F05D 2260/40311* (2013.01)

(58) Field of Classification Search
None
See application file for complete search history.

(56) References Cited

U.S. PATENT DOCUMENTS

| | | | | |
|---|---|---|---|---|
| 7,487,630 | B2* | 2/2009 | Weiler | F02K 3/06 |
| | | | | 60/268 |
| 9,709,136 | B2* | 7/2017 | Bouwer | F16H 3/663 |
| 10,018,119 | B2* | 7/2018 | Kupratis | F02C 7/36 |
| 11,118,506 | B2* | 9/2021 | Mondal | F02C 3/067 |
| 2006/0236675 | A1* | 10/2006 | Weiler | F02K 3/072 |
| | | | | 60/761 |
| 2013/0259652 | A1* | 10/2013 | Kupratis | F02C 7/36 |
| | | | | 415/122.1 |
| 2015/0354672 | A1* | 12/2015 | Bouwer | F16H 3/663 |
| | | | | 475/248 |
| 2020/0200082 | A1* | 6/2020 | Mondal | F02C 3/067 |

* cited by examiner

*Primary Examiner* — Juan G Flores
(74) *Attorney, Agent, or Firm* — WOMBLE BOND DICKINSON (US) LLP

(57) ABSTRACT

A power transmission module for an aircraft, the module including a torque input connected to a turbine shaft, a first torque output and a second torque output, the power transmission module including a mechanical reducer including a sun gear forming the torque input, and planet gears carried by a planet carrier, wherein each of the planet gears includes at least three independent toothings and further includes a first toothing meshed with the sun gear, a second toothing meshed with an element forming one of the torque outputs, and a third toothing meshed with another element.

12 Claims, 14 Drawing Sheets

[Fig.1]
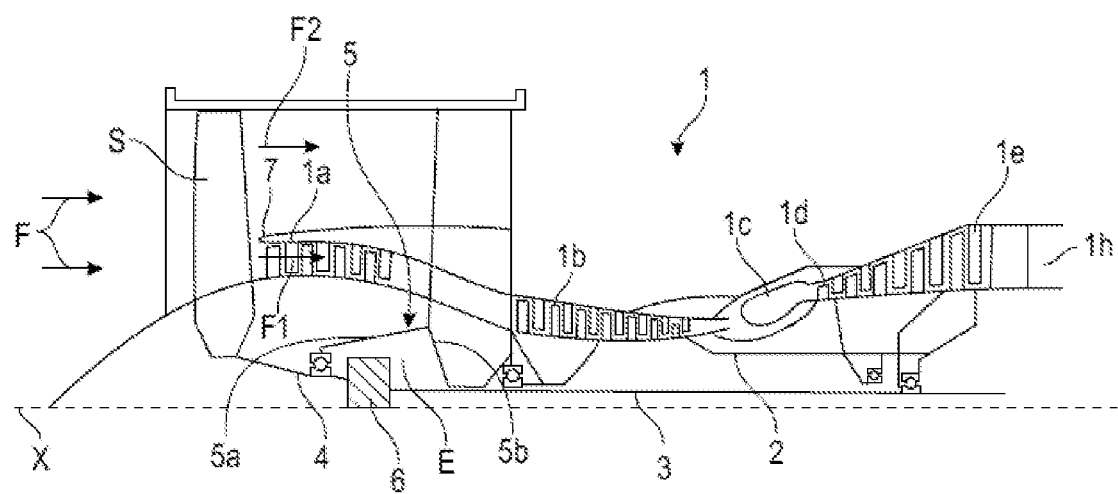

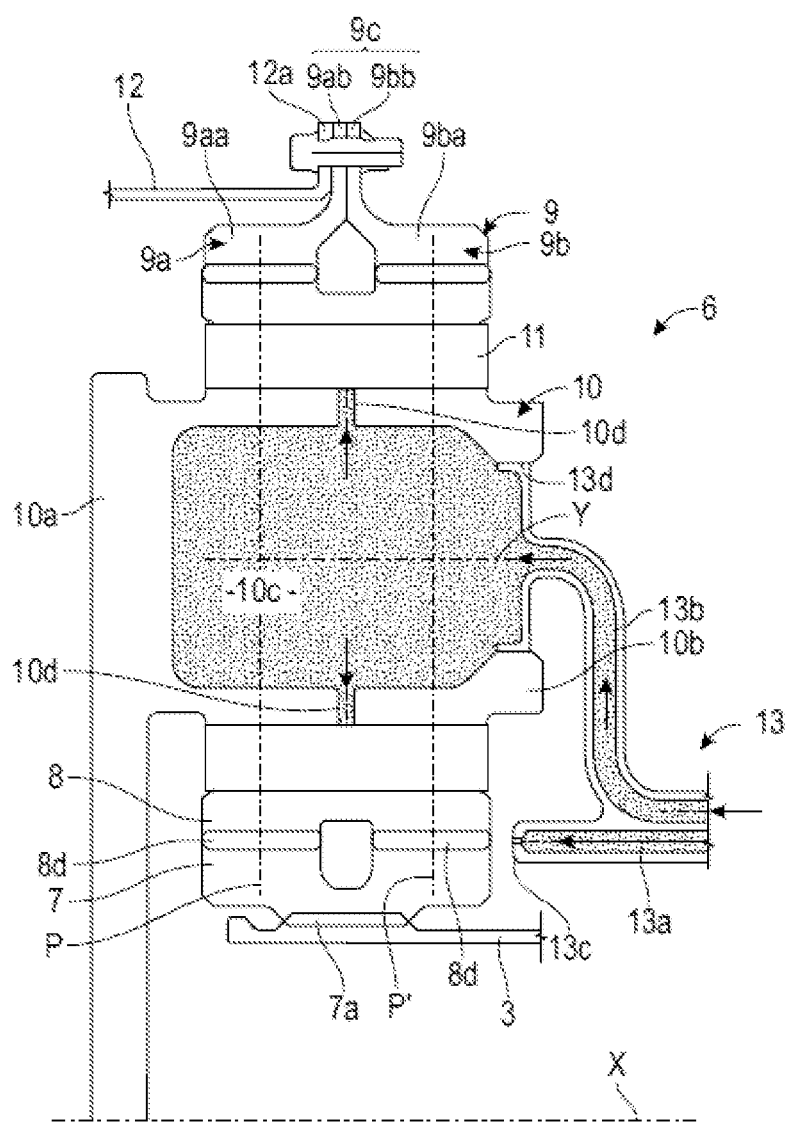
[Fig.2]

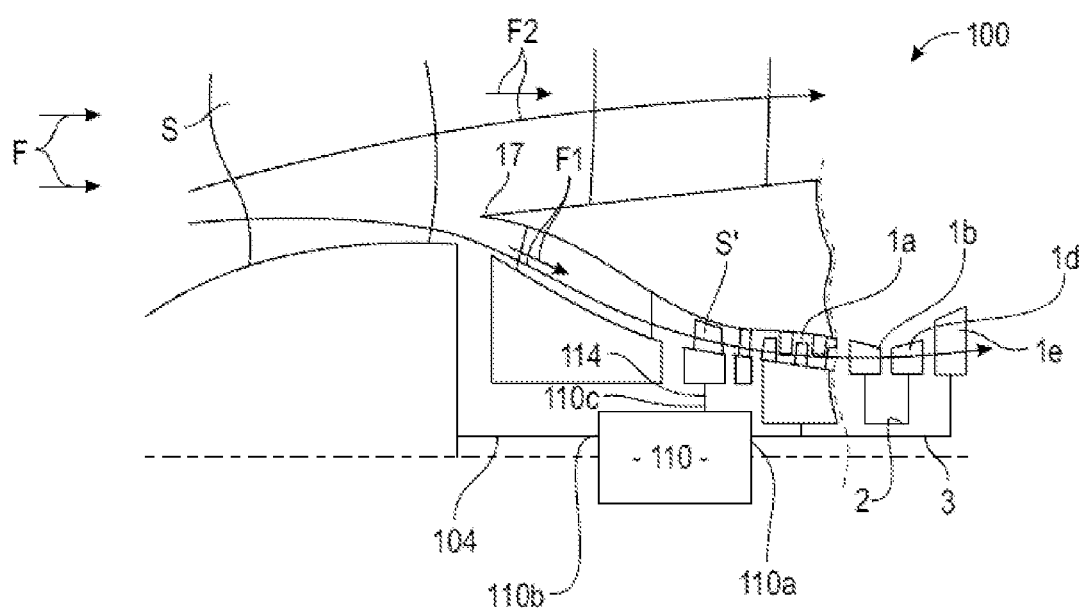
[Fig.3]

[Fig.4]
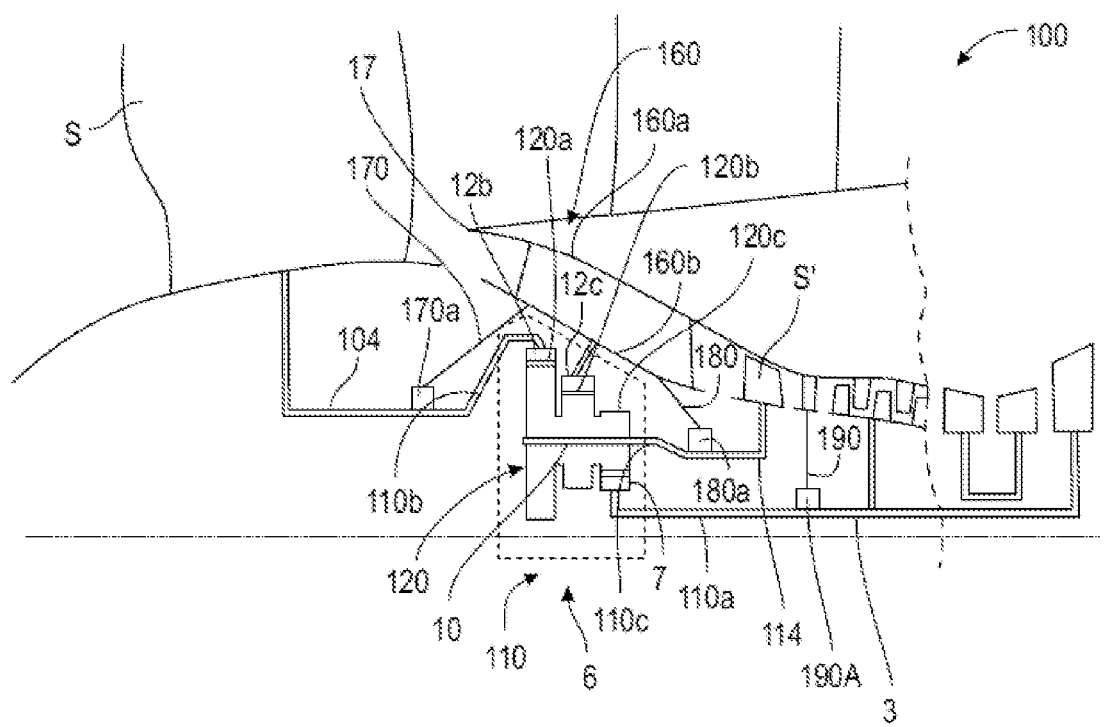

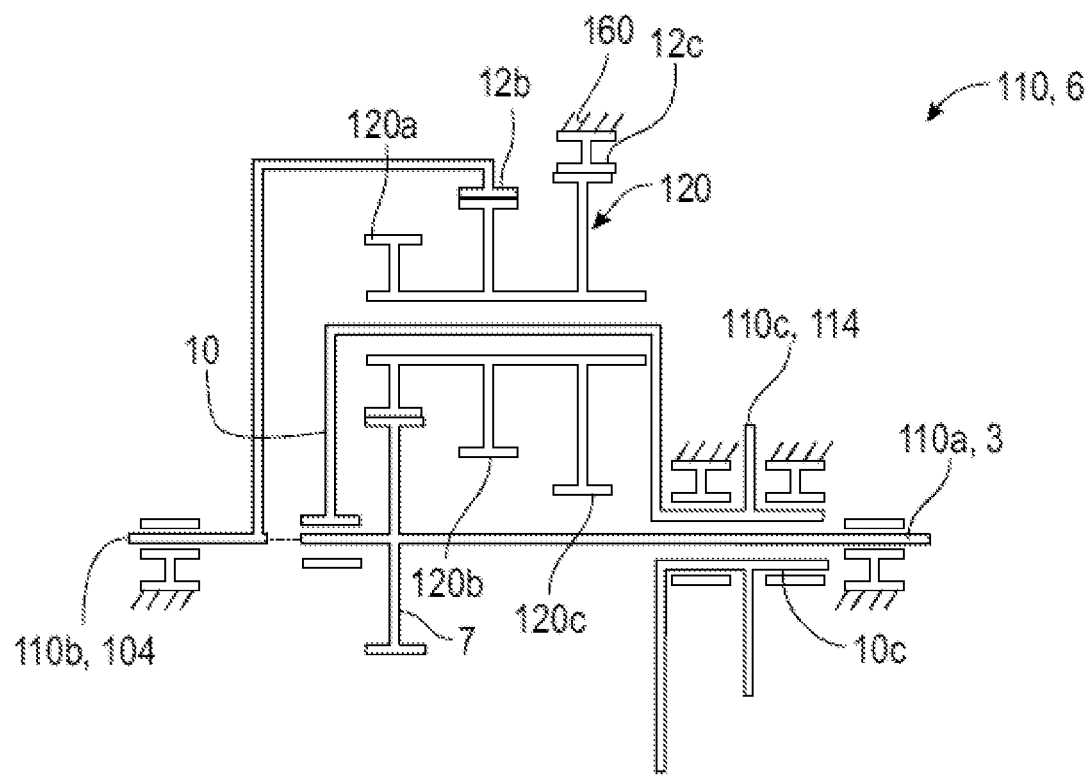
[Fig.5]

[Fig.6]
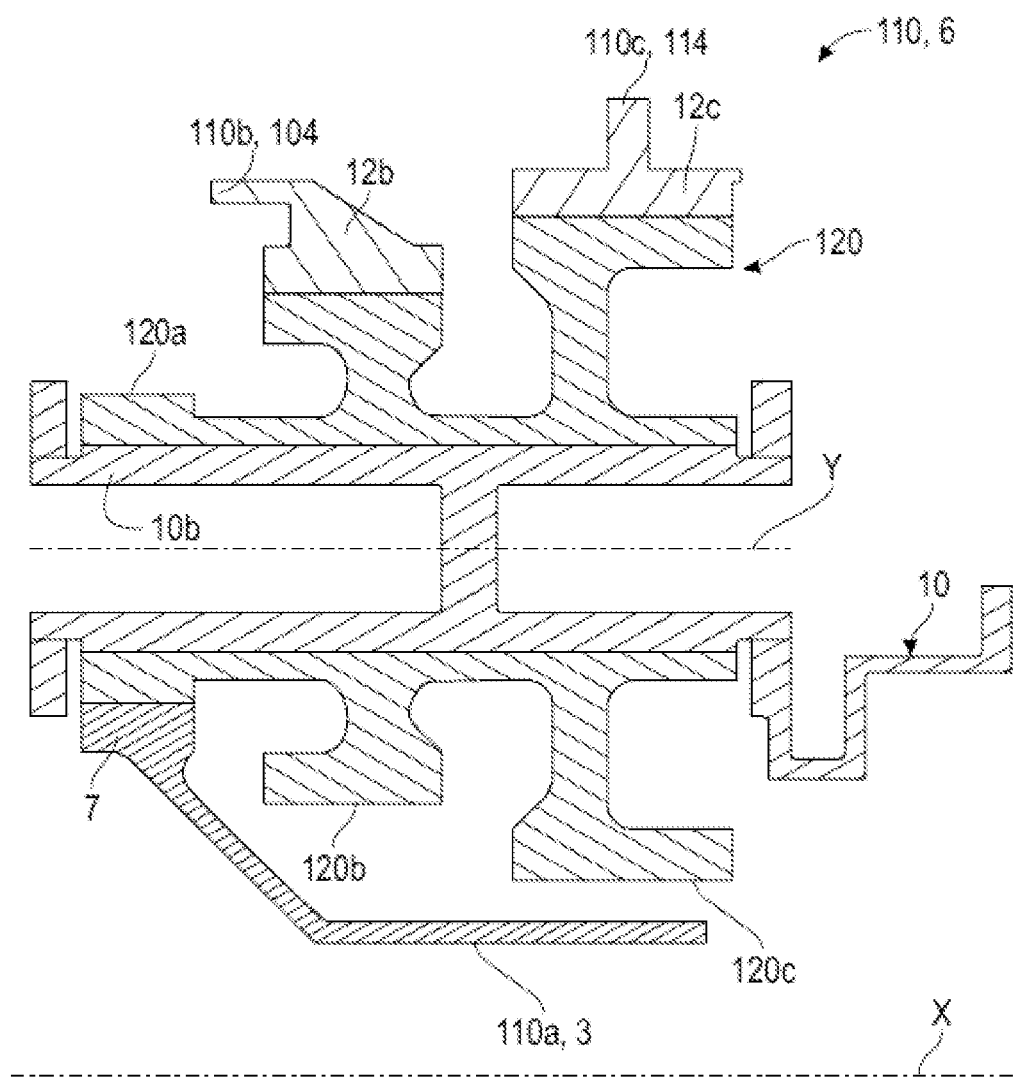

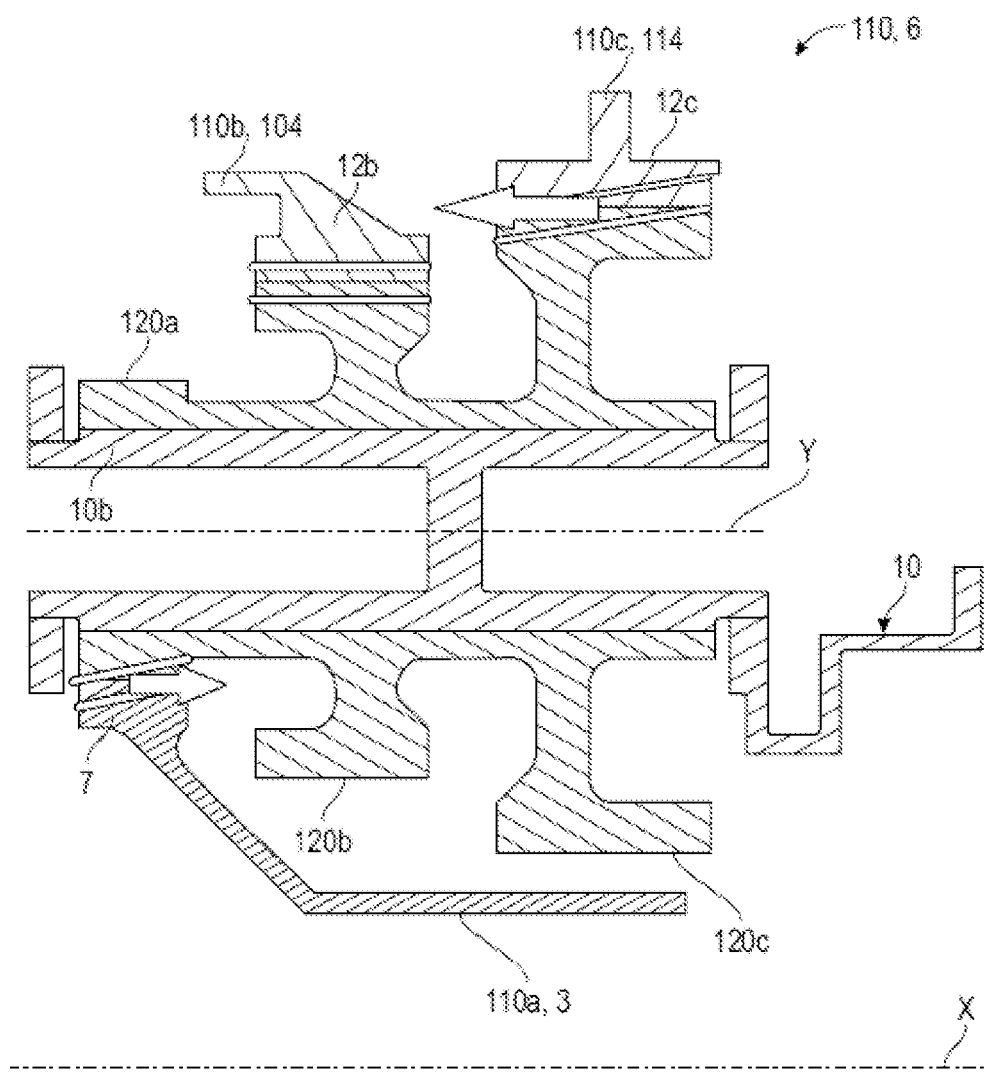
[Fig.7]

[Fig.8]
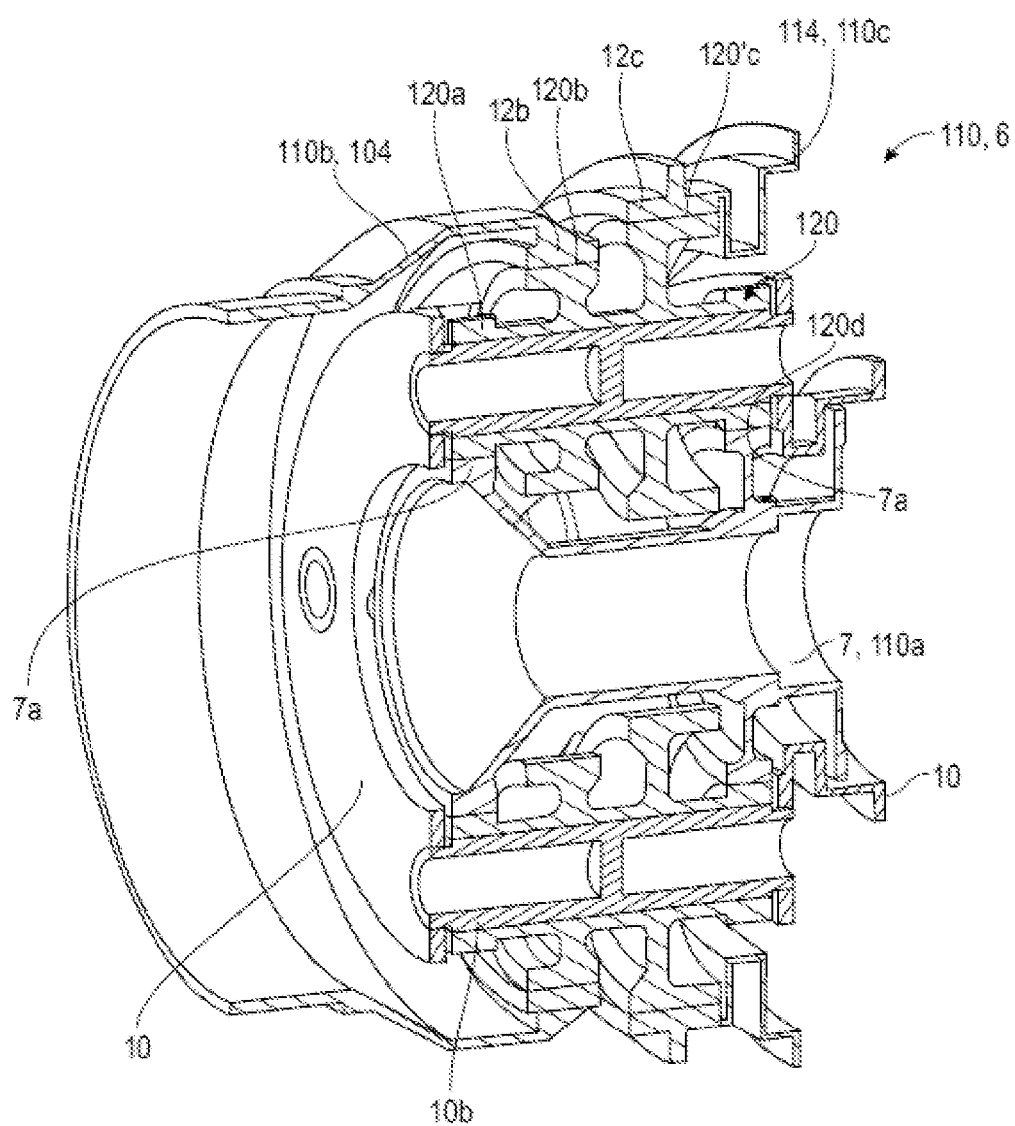

TR4

TR4'

[Fig.10]
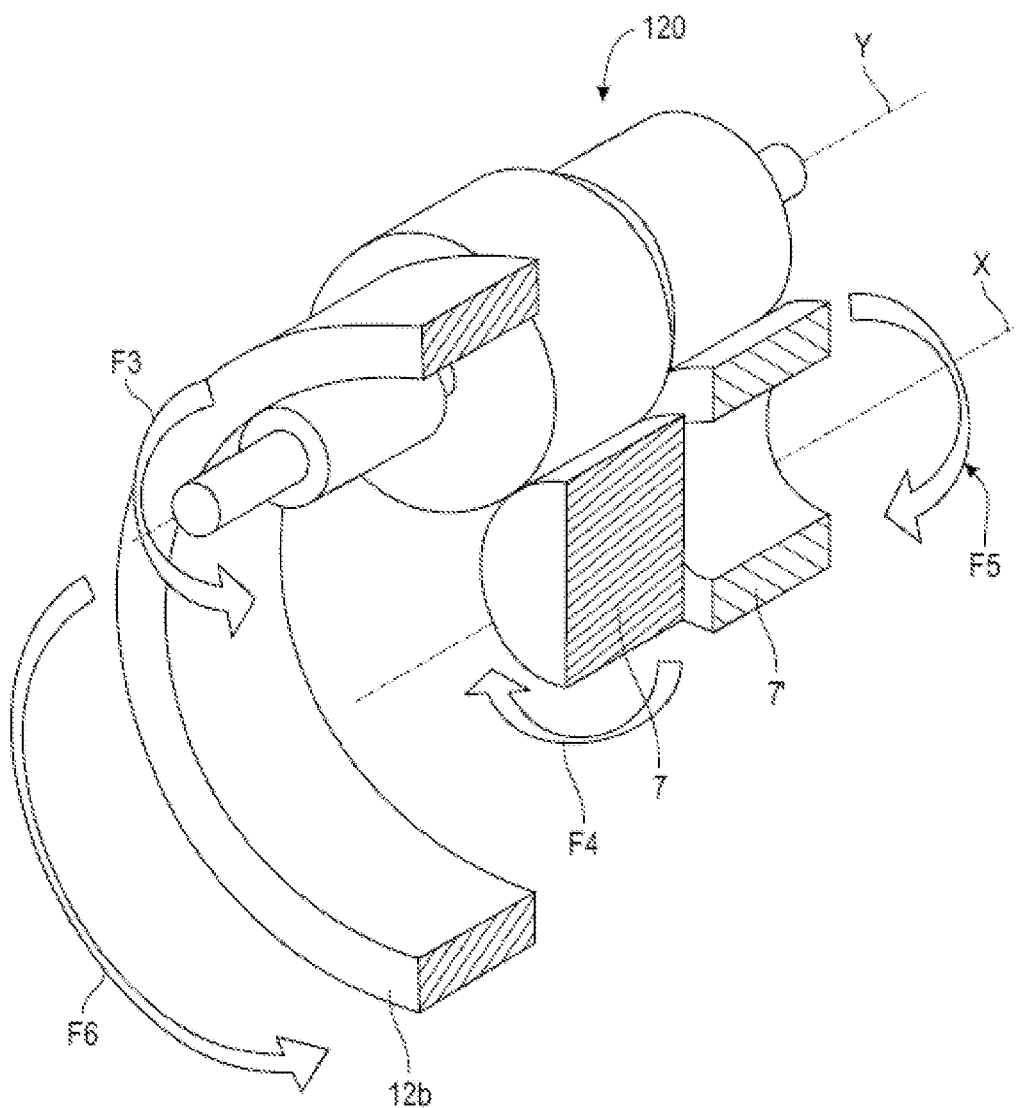

POWER TRANSMISSION MODULE FOR AN AIRCRAFT TURBOMACHINE

TECHNICAL FIELD OF THE INVENTION

The present invention relates to a power transmission module for an aircraft turbomachine, as well as a turbomachine comprising such a module.

TECHNICAL BACKGROUND

The prior art comprises in particular the documents WO-A1-2010/092263, FR-A1-2 987 416, FR-A1-3 008 462, FR-A1-3 008 463, FR-A1-3 041 054, US-A1-2015/354672, EP-A1-3 859 134 and US-B2-9 797 470.

The newer generations of double-flow turbomachines, in particular those with a high bypass ratio, comprise a mechanical reducer to drive a shaft of a fan propeller. The usual purpose of the reducer is to convert the speed of rotation referred to as high speed of the shaft of a power turbine into a slower speed of rotation for the shaft driving the fan propeller.

Such a reducer generally comprises a central sprocket, referred to as a sun gear, a ring gear and sprockets called planet gears, which are engaged between the sun gear and the ring gear. The planet gears are held by a chassis referred to as planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several reducer architectures. In the prior art of the double-flow turbomachines, the reducers are of the planetary or epicyclic type. In other similar applications, there are architectures referred to as differential or "compound".

In a planetary reducer, the planet carrier is stationary and the ring gear is the output shaft of the device which rotates in the opposite direction of the sun gear.

In an epicyclic reducer, the ring gear is stationary and the planet carrier is the output shaft of the device which rotates in the same direction as the sun gear.

On a compound reducer, no element is attached in rotation. The ring gear rotates in the opposite direction of the sun gear and the planet carrier.

The reducers can consist of one or more gear stages. This meshing is ensured in different ways such as by contact, friction or magnetic field.

In the present application, "stage" or "toothing" means at least one series of meshing teeth with at least one series of complementary teeth. A toothing can be internal or external.

A planet gear may comprise one or two gear stages. A single-stage planet gear comprises a toothing that can be straight, helical or herringbone, and whose teeth are located on a same diameter. This toothing cooperates with both the sun gear and the ring gear.

A double-stage planet gear comprises two toothings that are located on different diameters. A first toothing cooperates with the sun gear and a second toothing generally cooperates with the ring gear.

The new generations of turbomachines may comprise a mechanical reducer that drives the fan propeller as well as another propeller that can be considered a smaller fan or a secondary fan. The reducer is part of a power transmission module which is used to rotatably drive the main fan shaft on the one hand and to drive the secondary fan shaft on the other.

However, the technologies currently proposed for this type of power transmission module are not satisfactory, particularly from the point of view of their complexity, their overall dimensions and their mass.

The invention proposes an improvement allowing to ameliorate some or all of these disadvantages.

SUMMARY OF THE INVENTION

The invention relates to a power transmission module for an aircraft turbomachine, comprising:
  a torque input configured to be connected to a turbine shaft,
  a first torque output, and
  a second torque output,
    characterised in that each of the planet gears comprises at least three independent toothings and comprises:
  a second toothing meshed with an element forming one of the first and second torque outputs, and
  a third toothing meshed with another element, that other element forming the other of the first and second torque outputs when said planet carrier is stationary, or that other element being a stationary ring gear when said planet carrier is movable and forms the other of the first and second torque outputs.

In this application, the terms "upstream" and "downstream" refer to the flow of gases through the turbomachine, and in particular through the ducts of the turbomachine (from upstream to downstream).

The invention thus proposes the use of triple-toothings planet gears in the reducer of the power transmission module. One of these toothings is meshed with the sun gear and dedicated to the transmission of the input torque. Another of these toothings is meshed with an element dedicated to the transmission of one of the output torques, this other element being for example a ring gear or another sun gear. Finally, the last toothing is meshed with another element that can either be dedicated to the transmission of the other of the output torques, or a stationary ring gear. In the first case, when the other element is dedicated to the transmission of an output torque, it is the planet carrier of the reducer that is stationary. In the second case, when the other element is a stationary ring gear, it is the planet carrier that is movable and is dedicated to the transmission of the other of the output torques.

There are a multitude of possible configurations depending in particular on the positions of the torque inputs and outputs, the diameters of the toothings, the types of toothings (helix, straight, herringbones), etc.

This solution is compatible with a reducer with a plurality stages. It is also compatible with a reducer with a rotating planet carrier such as the epicyclic or differential reducers. It is also compatible with a reducer with straight, helical or herringbone toothings. It is also compatible with a reducer with monobloc planet carrier or of the cage and cage carrier type.

The module according to the invention may comprise one or more of the following characteristics, taken alone or in combination with each other:
  said first, second and third toothings have different diameters;
  said second torque output comprises a tubular segment through which said first torque output passes;

the element forming said second torque output is a ring gear or another sun gear;

said first, second and third toothings are selected from straight, helix or herringbone toothings;

said first toothing is located upstream and is of the helix type, the second toothing is meshed with said first torque output and is of the straight type, and said third toothing located downstream is meshed with the stationary ring gear and is of the helix type;

said first toothing is located upstream and is of the herringbone type, the second toothing is meshed with said first torque output and is of the straight type, and said third toothing located downstream is meshed with the stationary ring gear and is of the helix type;

each of the planet gears comprises a fourth toothing;

each of the planet gears comprises two independent toothings meshed with two independent toothings of the sun gear and separated from each other by two other toothings of the planet gear.

The present invention further relates to an aircraft turbomachine, comprising at least one module as described above.

The turbomachine according to the invention may comprise one or more of the following characteristics, taken in isolation from each other, or in combination with each other:

a gas generator equipped with a turbine comprising a turbine shaft with an axis of rotation, a main fan propeller rotatably driven by a main shaft coupled to the first torque output, this propeller being located upstream of a first annular splitter nose for separating two annular flow ducts for an internal primary flow and an external secondary flow respectively, a secondary fan propeller driven in rotation by a secondary shaft coupled to the second torque output, this propeller being located in the flow duct for the primary flow;

the transmission module is located inside an annular casing which comprises two coaxial annular walls, respectively internal and external, defining between them said flow duct for the primary flow;

the internal annular wall of the annular casing is connected to an upstream annular support of at least one rolling bearing for guiding said first torque output, and/or to a downstream annular support of at least one rolling bearing for guiding said second torque output;

the internal annular wall of the annular casing is connected to said stationary ring gear which is located between said first and second supports.

BRIEF DESCRIPTION OF THE FIGURES

Further characteristics and advantages will be apparent from the following description of a non-limiting embodiment of the invention with reference to the appended drawings in which:

FIG. 1 is a schematic axial cross-sectional view of a turbomachine for an aircraft, FIG. 2 is a partial axial cross-sectional view of a mechanical reducer, FIG. 3 is a schematic axial cross-sectional view of a turbomachine for an aircraft, FIG. 4 is a schematic axial cross-sectional view of a turbomachine for an aircraft in accordance with the invention, FIG. 5 is a very schematic axial cross-sectional view of a power transmission module of the turbomachine of FIG. 4, FIG. 6 is a partial schematic view in axial cross-section of the power transmission module of the turbomachine of FIG. 4, FIG. 7 is another partial schematic view in axial cross-section of the power transmission module of the turbomachine of FIG. 4 and illustrates a variant of embodiment of the toothing of the planet gears;

FIG. 8 is a schematic perspective view in axial cross-section of the power transmission module of the turbomachine of FIG. 4 and illustrates another variant of embodiment of the toothings of the planet gears;

FIG. 10 is a partial schematic view of a power transmission module in perspective and axial cross-section and shows the directions of rotation of its parts.

DETAILED DESCRIPTION OF THE INVENTION

Figure 9A:
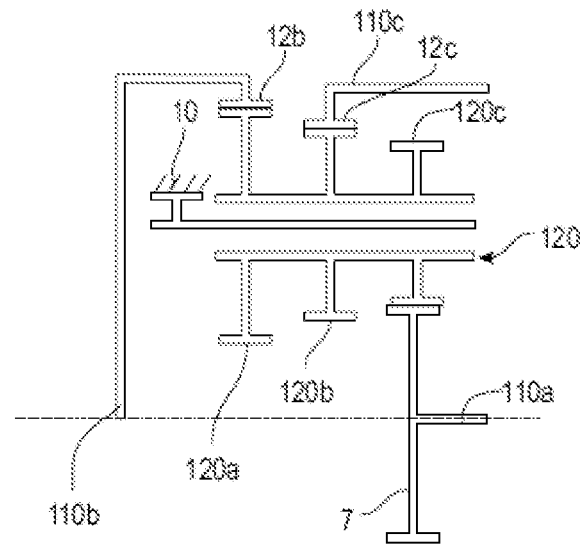
FIGS. 9a and 9b are similar views to that of FIG. 5 and illustrate alternative embodiments of the power transmission module.

FIG. 1 describes a turbomachine 1 which conventionally comprises a fan S or fan propeller and a gas generator comprising a low pressure compressor 1a, a high pressure compressor 1b, an annular combustion chamber 1c, a high pressure turbine 1d, a low pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The turbomachine 1 is here double-flow in the sense that two air flows, respectively primary F1 and secondary F2, flow along the longitudinal axis X of the turbomachine. The air inlet flow F entering the turbomachine and passing through the fan S is divided in two downstream of the fan by an annular splitter nose 17. A radially internal air flow flows within the splitter nose 17 and forms the primary flow F1 which flows within the gas generator. A radially external air flow flows out of the splitter nose 17 and forms the secondary flow F2 which flows around the gas generator.

The fan S is driven by a fan shaft 4 which is driven by the LP shaft 3 by means of a reducer 6. This reducer 6 is generally of the planetary or epicyclic type.

The following description relates to a reducer of the epicyclic type, in which the planet carrier and the sun gear are rotatable, the ring gear of the reducer being stationary in the reference frame of the engine.

The reducer 6 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 6. This enclosure E is here closed upstream by seals at the level of a bearing allowing the passage of the fan shaft 4, and downstream by seals at the level of the passage of the LP shaft 3.

FIG. 2 shows an epicyclic reducer 6. In the input, the reducer 6 is connected to the LP shaft 3, for example by means of internal splines 7a. Thus the LP shaft 3 drives a planetary sprocket referred to as the sun gear 7. Classically, the sun gear 7, whose axis of rotation is coincident with that of the longitudinal axis X, drives a series of sprockets referred to as planet gears 8, which are equally spaced on the same diameter around the axis of rotation X. This diameter is equal to twice the operating centre distance between the sun gear 7 and the planet gears 8. The number of planet gears 8 is generally defined between three and seven for this type of application.

The assembly of planet gears 8 is held by a chassis referred to as planet carrier 10. Each planet gear 8 rotates around its own axis Y, and meshes with the ring gear 9.

In the output we have:

In this epicyclic configuration, the assembly of planet gears 8 drives the planet carrier 10 in rotation about the axis X of the turbomachine. The ring gear is secured to the engine casing or stator 5 via a ring gear carrier 12 and the planet carrier 10 is secured to the fan shaft 4.

In another planetary configuration, the assembly of the planet gears 8 is held by a planet carrier 10 which is attached to the engine casing or stator 5. Each planet gear drives the ring gear which is fitted to the fan shaft 4 via a ring gear carrier 12.

In another differential configuration, the assembly of planet gears 8 is held by a planet carrier 10 which is connected to a first fan shaft 5. Each planet gear drives the ring gear which is fitted to a second counter-rotating fan shaft 4 via a ring gear carrier 12.

Each planet gear 8 is mounted free in rotation by means of a bearing 11, for example of the rolling bearing or hydrodynamic bearing type. Each bearing 11 is mounted on one of the axles 10b of the planet carrier 10 and all axles are positioned relative to each other using one or more structural chassis 10a of the planet carrier 10. There are a number of axles 10b and bearings 11 equal to the number of planet gears. For reasons of operation, mounting, manufacture, inspection, repair or replacement, the axles 10b and the chassis 10a can be separated into several parts.

For the same reasons mentioned above, the toothing of a planet gear can be separated into several propellers or teeth each with a median plane P, P'. In our example, we detail the operation of a reducer in which each planet gear comprises two series of herringbone teeth cooperating with a ring gear separated into two half-ring gears:

an upstream half-ring gear 9a consisting of a rim 9aa and an attachment half-flange 9ab. On the rim 9aa is the front propeller meshed with a propeller of the toothing 8d of each planet gear 8. The propeller of the toothing 8d also meshes with that of the sun gear 7.

a downstream half-ring gear 9b consisting of a rim 9ba and an attachment half-flange 9bb. On the rim 9ba is the rear propeller meshed with a propeller of the toothing 8d of each planet gear 8. The propeller of the toothing 8d also meshes with that of the sun gear 7.

If the propeller widths vary between the sun gear 7, the planet gears 8 and the ring gear 9 because of the toothing overlaps, they are all centred on a median plane P for the upstream teeth and on another median plane P' for the downstream teeth.

FIG. 2 thus illustrates the case of a single gearing stage reducer, i.e. a same toothing 8d of each planet gear 8 cooperates with both the sun gear 7 and the ring gear 9. Even though the toothing 8d comprises two series of teeth, these teeth have the same average diameter and form a single toothing referred to as herringbone.

The attachment half-flange 9ab of the upstream half-ring gear 9a and the attachment half-flange 9bb of the downstream half ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 describe the conveying of the oil in the reducer 6. The oil enters the reducer 6 from the stator portion 5 into a dispenser 13 by different means which will not be specified in this view because they are specific to one or more types of architecture. The dispenser 13 comprises injectors 13a and arms 13b. The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and flows through the feed opening 13d of the bearing. The oil then circulates through the axle into one or more buffer areas 10c and emerges through the orifices 10d in order to lubricate the bearings of the planet gears.

FIG. 3 shows an aircraft turbomachine 100 with double-flow.

The references used in FIG. 1 are used in FIG. 3 to designate the same elements.

The air inlet flow F entering the turbomachine 100 and passing through the fan S, which is here a main fan, is split in two downstream of the fan S by an annular splitter nose 17. A radially internal air flow flows into the splitter nose 17 and forms the primary flow F1. A radially external air flow flows out of the splitter nose 17 and forms the secondary flow F2 which flows around the gas generator.

The turbomachine 1 comprises a secondary fan S' which comprises a propeller or bladed wheel located in the flow duct for the primary flow F1.

The turbomachine 100 comprises a power transmission module 110 comprising a torque input 110a connected to the low pressure shaft 3, a first torque output 110b connected to the main drive shaft 104 of the rotor and the propeller of the main fan S, and a second torque output 110c connected to the secondary drive shaft 114 of the rotor and the propeller of the secondary fan S'.

FIG. 4 illustrates a double-flow turbomachine 100 in accordance with one embodiment of the invention.

The power transmission module 110 of this turbomachine 100 comprises a reducer 6 similar to that of FIGS. 1 and 2, and comprises planet gears 120 with three independent toothings 120a, 120b, 120c (only one planet gear being visible in FIG. 4).

The reducer 6 comprises the torque input 110a and the two torque outputs 110b, 110c.

The torque input 110a is formed by the sun gear 7 of the reducer 6, which is coupled to the low-pressure shaft 3 and is meshed with one of the toothings (120c in the example of FIG. 4) of each of the planet gears 120.

As will be explained in detail in the following, there are a multitude of possible configurations for the meshing of the toothings 120a, 120b, 120c of the planet gears 120. FIGS. 4 to 8 and 9a to 9j illustrate several possible configurations and several variants of a same configuration, among the multitude of possible configurations (over 1000).

As can be seen in FIGS. 4 to 8 in particular, the diameters of the toothings 120a, 120b, 120c can be different. The toothings 120a, 120b, 120c may be arranged in any manner or according to their diameters, for example from smallest to largest diameter from upstream to downstream, or from largest to smallest diameter from upstream to downstream. Each of the toothings can be meshed with a ring gear or a sun gear.

The advantage of changing the positional gears is that it allows to balance the forces in the planet gears 120a, 120b, 120c and minimizes the residual moments.

Generally speaking, the toothing located upstream is referred to as "upstream toothing", the toothing located downstream is referred to as "downstream toothing" and the toothing located between the upstream and downstream toothings is referred to as the "intermediate toothing".

In the example shown in FIG. 4, the larger diameter upstream toothing 120a is meshed with a first ring gear 12b forming the first torque output 110b and connected to the main shaft 104. This main shaft 104 is rotatably guided by at least one rolling bearing 170a that is carried by an upstream annular support 170.

The smaller diameter downstream toothing 120c is meshed with the sun gear 7 which forms the torque input 110a and is connected to the low-pressure shaft 3.

The intermediate toothing 120b is meshed with a second ring gear 12c which is stationary.

The planet carrier 10 of the reducer 6 is rotatable and forms the second torque output 110c by being connected to the secondary shaft 114. This secondary shaft 114 is rotatably guided by at least one rolling bearing 180a that is carried by a downstream annular support 180.

The transmission module 110 is located inside an annular casing 160 that comprises two coaxial annular walls 160a, 160b defining the flow duct for the primary flow F1 between them.

The annular supports 170, 180 are attached to the casing 160. The bearings 170a, 180a are located respectively upstream and downstream of the module 110. The ring gear 12c is located between the supports 170, 180.

The low-pressure shaft 3 is rotatably guided by at least one rolling bearing 190a which is carried by another annular support 190.

In the example shown in FIG. 5, the smaller diameter upstream toothing 120a is meshed with the sun gear 7 which forms the torque input 110a and is connected to the low-pressure shaft 3. An upstream end of the low-pressure shaft 3 or the sun gear 7 can be centred and guided inside the planet carrier 10, upstream of the reducer 6.

The planet carrier 10 is rotatable and forms the second torque output 110c by being connected to the secondary shaft 114. The planet carrier 10 comprises a downstream tubular segment 10e through which the low-pressure shaft 3 passes. The guide bearings (not shown) of the planet carrier 10 or of the secondary shaft 114 may be carried by the casing 160, as discussed above.

The downstream toothing 120c of larger diameter is meshed with a stationary ring gear 12c connected to the casing 160.

The intermediate toothing 120b is meshed with the ring gear 12b which is rotatable and forms the first torque output 110b by being connected to the main shaft 104. The guide bearing (not shown) for this main shaft 104 may be carried by the casing 160, as discussed above.

FIG. 6 is a less schematic view of the reducer 6 in FIG. 5. The types of toothings can be identical or different. For example, the toothings 120a, 120b, 120c can be all straight, helix or herringbone. Alternatively, all configurations and associations are possible.

In the case of FIG. 7, for example, the upstream toothing 120a is of the helix type, the intermediate toothing 120b is of the straight type, and the downstream toothing 120c is of the helix type. With a predefined propeller angle, it is possible with such a solution to cancel the axial forces on the planet gears 120.

In the case of FIG. 8, the upstream toothing 120a is of the herringbone type, the intermediate toothing 120b is of the straight type, and the downstream toothing 120'c is of the helix type. Each of the planet gears 120 further comprises a fourth toothing 120d meshed with the sun gear 7. The toothings 120b, 120'c are located between the toothings 120a, 120d and the sun gear 7 comprises two independent and axially spaced toothings 7a for meshing with the toothings 120a, 120d.

This last solution is interesting because it allows to keep the direction of rotation on the two torque outputs 110b, 110c. In contrast to a solution with an output on a second sun gear, this solution is suitable for a reduction ratio higher than 1.9.

In the configuration TR1 of FIG. 9a, the smaller diameter downstream toothing 120c is meshed with the sun gear 7. The larger diameter upstream toothing is meshed with the ring gear 12b which forms the first torque output 110b, and the intermediate toothing 120b is meshed with the ring gear 12c which forms the second torque output 110c. The planet carrier 10 is stationary.

Figure 9B:
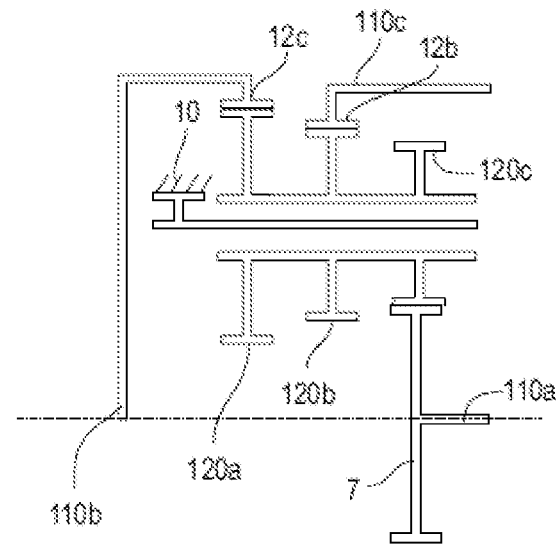

The configuration TR1' in FIG. 9b is close to the configuration TR1. The difference concerns the upstream toothing 120a which is meshed with the ring gear 12c that forms the second torque output 110c, and the intermediate toothing 120b is meshed with the ring gear 12b that forms the first torque output 110b.

Figure 9C:
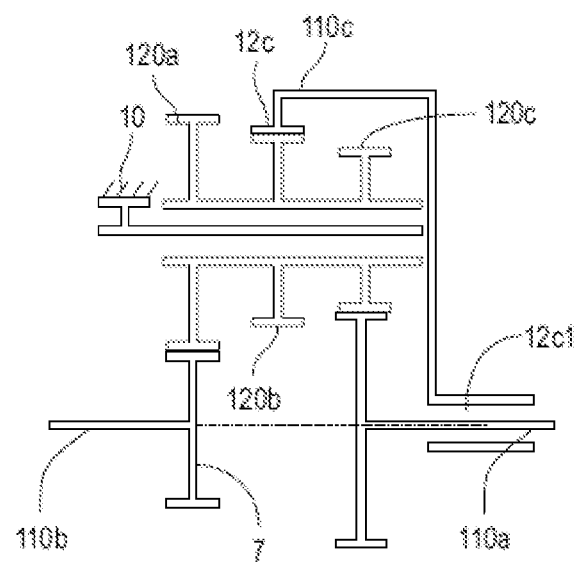
FIGS. 9c and 9d are similar views to the one shown in FIG. 5 and illustrate other variants embodiments of the power transmission module.

In the configuration TR2 of FIG. 9c, the smaller diameter downstream toothing 120c is meshed with the sun gear 7. The larger diameter upstream toothing 120a is meshed with another sun gear 7' which forms the first torque output 110b, and the intermediate toothing 120b is meshed with the ring gear 12c which forms the second torque output 110c and which comprises a tubular segment 12c1 through which the sun gear 7 or the low-pressure shaft 3 passes. The planet carrier 10 is stationary.

Figure 9D:
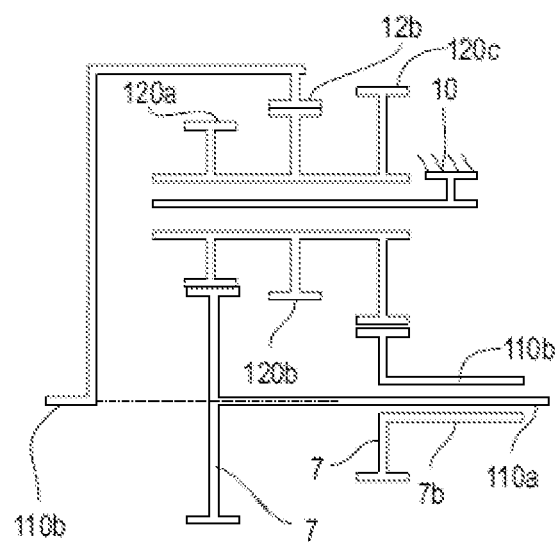

In the configuration TR2' of FIG. 9d, the smaller diameter upstream toothing 120a is meshed with the sun gear 7. The larger diameter downstream toothing 120c is meshed with another sun gear 7' which comprises a tubular segment 7b through which the sun gear 7 or the low-pressure shaft 3 passes and which forms the second torque output 110c. The intermediate toothing 120b is meshed with the ring gear 12b which forms the first torque output 110b. The planet carrier 10 is stationary.

Figure 9E:
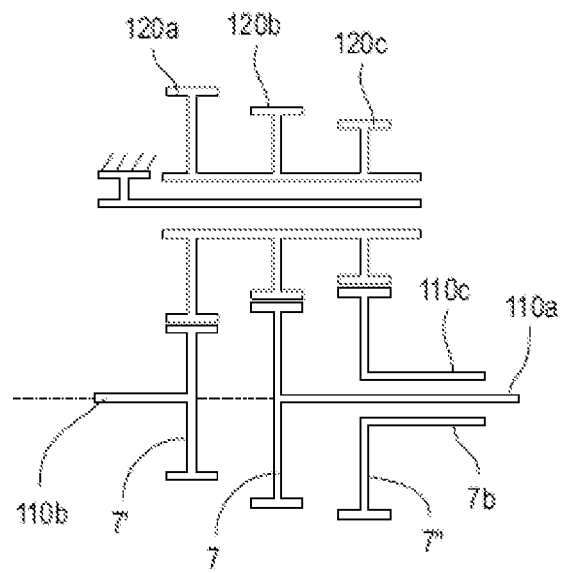
FIGS. 9e and 9f are views similar to that of FIG. 5 and illustrate other variants embodiments of the power transmission module.

In the configuration TR3 of FIG. 9e, the intermediate toothing 120b is meshed with the sun gear 7. The larger diameter upstream toothing 120a is meshed with another sun gear 7' which forms the first torque output 110b. The smaller diameter downstream toothing 120c is meshed with another sun gear 7" which comprises a tubular segment 7b through which the sun gear 7 or the low-pressure shaft 3 passes and which forms the second torque output 110c. The planet carrier 10 is stationary.

Figure 9F:
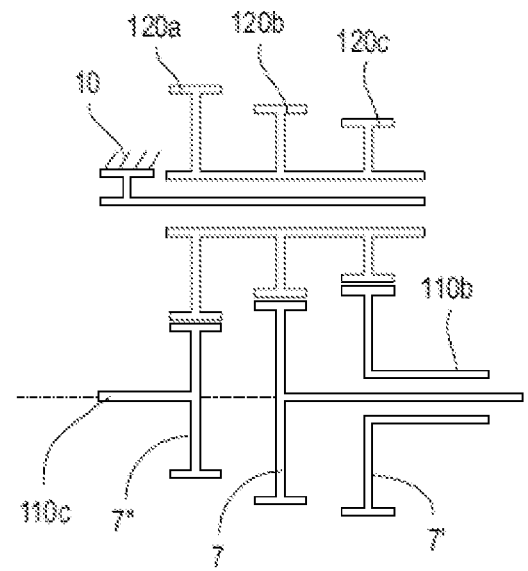

The configuration TR3' in FIG. 9f is close to the configuration TR3. The difference concerns the upstream toothing 120a which is meshed with the sun gear 7" which forms the second torque output 110c, and the downstream toothing 120c is meshed with the sun gear 7' which forms the first torque output 110b.

Figure 9G:
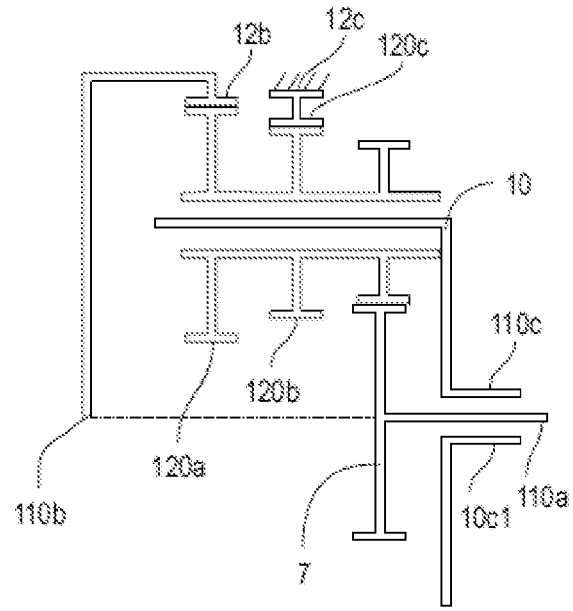
FIGS. 9g and 9h are similar views to that of FIG. 5 and illustrate other variants embodiments of the power transmission module.

In the configuration TR4 of FIG. 9g, the smaller diameter downstream toothing 120c is meshed with the sun gear 7. The larger diameter upstream toothing 120a is meshed with the ring gear 12b which forms the first torque output 110b. The intermediate toothing 120b is meshed with the stationary ring gear 12c. The planet carrier 10 is movable and comprises a tubular segment 10e through which the sun gear 7 or the low-pressure shaft 3 passes and forms the second torque output 110c.

Figure 9H:
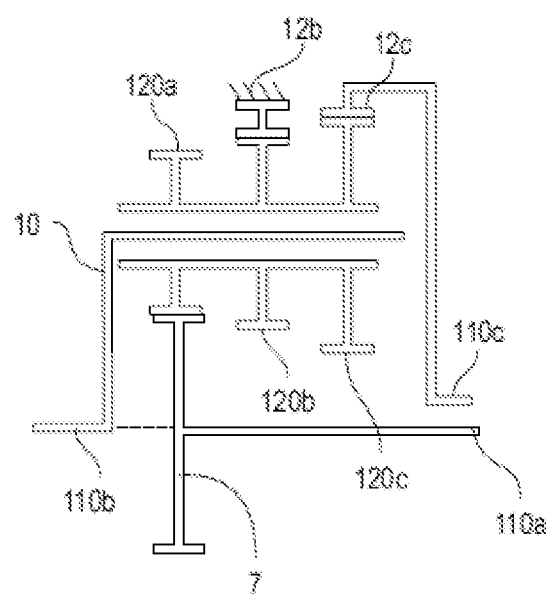

In the configuration TR4' of FIG. 9h, the smaller diameter upstream toothing 120a is meshed with the sun gear 7. The larger diameter downstream toothing 120c is meshed with the ring gear 12c which forms the second torque output 110c. The intermediate toothing 120b is meshed with the stationary ring gear 12b. The planet carrier 10 is movable and forms the first torque output 110b.

Figure 9I:
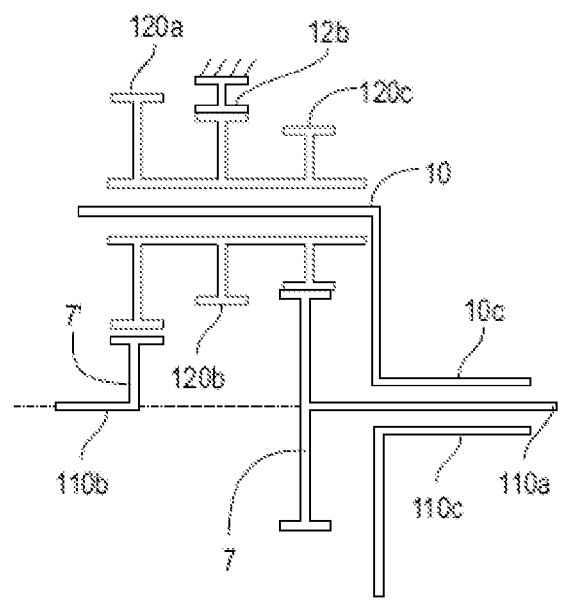
FIGS. 9i and 9j are views similar to that of FIG. 5 and illustrate other variants embodiments of the power transmission module.

In the configuration TR5 in FIG. 9i, the smaller diameter downstream toothing 120c is meshed with the sun gear 7. The larger diameter upstream toothing 120a is meshed with another sun gear 7' which forms the first torque output 110b. The intermediate toothing 120b is meshed with the stationary ring gear 12b. The planet carrier 10 is movable and comprises a tubular segment 10e through which the sun gear 7 or the low-pressure shaft 3 passes and forms the second torque output 110c.

Figure 9J:
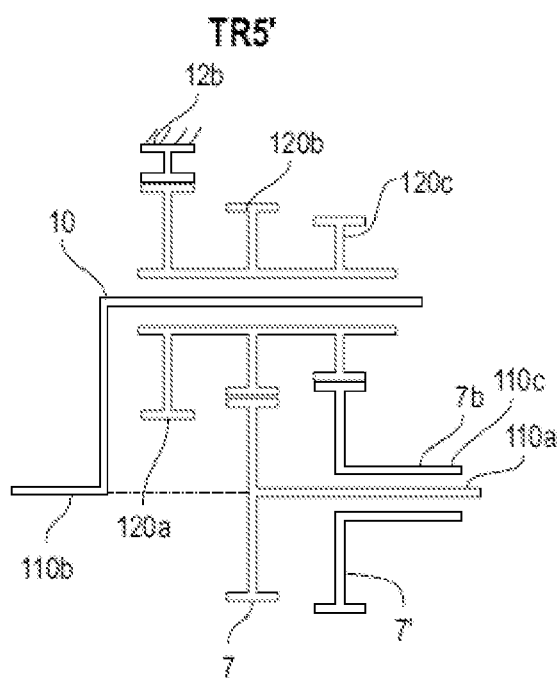

In the configuration TR5' of FIG. 9j, the intermediate toothing 120b is meshed with the sun gear 7. The larger diameter upstream toothing 120a is meshed with the stationary ring gear 12b. The smaller diameter downstream toothing 120c is meshed with another sun gear 7' which comprises a tubular segment 7b through which the sun gear 7 or the low-pressure shaft 3 passes and forms the second torque output 110c. The planet carrier 10 is movable and forms the first torque output 110b.

FIG. 10 shows the directions of rotation of the parts of the reducer 6 of the power transmission module 110. Only one planet gear 120 is shown and the arrow F3 shows its direction of rotation around its axis Y. The sun gears 7, 7' rotate in the same direction of rotation F4, F5 around the longitudinal axis X of the reducer 6. The ring gear 12b rotates in the opposite direction around this axis X.

All these solutions allow to obtain two outputs from one input with constant reduction ratios. Depending on the desired reduction ratio and directions of rotation, one or more configurations can meet the need. For example, if a ratio of 1/1.5/8 is desired (i.e., a torque input 110a at 1, a first torque output 110b at 1:1.5 and a second torque output 110c at 1:8) then one of the solutions to be preferred is of the type TR4.

The power transmission module 110 according to the invention thus allows, from the high speed transmitted by the low-pressure shaft 3, to provide two torque outputs with two different speeds, while minimizing the mass and overall dimension of the reducer 6 of this module. The invention is particularly suitable for low reduction ratios, e.g., less than two, and for powers in the megawatt range.

Although the invention is illustrated in the scope of an aircraft double-flow turbomachine, the module can be equipped to any other type of turbomachine.

The invention claimed is:

1. An aircraft turbomachine, comprising:
a gas generator equipped with a turbine comprising a turbine shaft with an axis of rotation, and
a main fan propeller driven in rotation by a main propeller shaft, said main fan propeller being located upstream of a first annular splitter nose for separating a first annular flow duct for an internal primary flow from a second annular flow duct for an external secondary flow,
a secondary fan propeller driven in rotation by a secondary propeller shaft, said secondary fan propeller being located in the first annular flow duct, and
a power transmission module, comprising
a torque input configured to be connected to said turbine shaft,
a first torque output coupled to the main propeller shaft, and
a second torque output coupled to the secondary propeller shaft,
said power transmission module comprising a mechanical reducer comprising a sun gear forming said torque input, and planet gears carried by a planet carrier,
each of the planet gears comprising at least three independent toothings and comprising:
a first toothing meshed with the sun gear,
a second toothing meshed with an element forming one of the first and second torque outputs, and
a third toothing meshed with another element, said another element forming the other of the first and second torque outputs when said planet carrier is stationary, or said another element being a stationary ring gear when said planet carrier is movable and forms the other of the first and second torque outputs.

2. The aircraft turbomachine of claim 1, wherein said first, second and third toothings have different diameters.

3. The aircraft turbomachine of claim 1, wherein said second torque output comprises a tubular segment through which said first torque output passes.

4. The aircraft turbomachine according to claim 1, wherein the element forming said second torque output is a ring gear or another sun gear.

5. The aircraft turbomachine according to claim 1, wherein said first, second, and third toothings are selected from straight, helix, or herringbone toothings.

6. The aircraft turbomachine of claim 5, wherein said first toothing is located upstream and is of the helix type, the second toothing is meshed with said first torque output and is of the straight type, and said third toothing located downstream is meshed with the stationary ring gear and is of the helix type.

7. The aircraft turbomachine of claim 5, wherein said first toothing is located upstream and is of the herringbone type, the second toothing is meshed with said first torque output and is of the straight type, and said third toothing located downstream is meshed with the stationary ring gear and is of the helix type.

8. The aircraft turbomachine of claim 1, wherein each of the planet gears comprises a fourth toothing.

9. The aircraft turbomachine according to claim 1, wherein each of the planet gears comprises two independent toothings meshed with two independent toothings of the sun gear and separated from each other by two other toothings of the planet gear.

10. The aircraft turbomachine according to claim 1, wherein the power transmission module is located inside an annular casing which comprises two coaxial annular walls, respectively internal and external, defining between them said first annular flow duct.

11. The aircraft turbomachine of claim 10, wherein the internal annular wall of the annular casing is connected to an upstream annular support of at least one rolling bearing for guiding said first torque output, and/or to a downstream annular support of at least one rolling bearing for guiding said second torque output.

12. The aircraft turbomachine of claim 11, wherein the internal annular wall of the annular casing is connected to said stationary ring gear which is located between said upstream and downstream supports.

\* \* \* \* \*